W. H. STODDARD.
PIPE COUPLING.
APPLICATION FILED JULY 24, 1907.
909,959.
Patented Jan. 19, 1909.
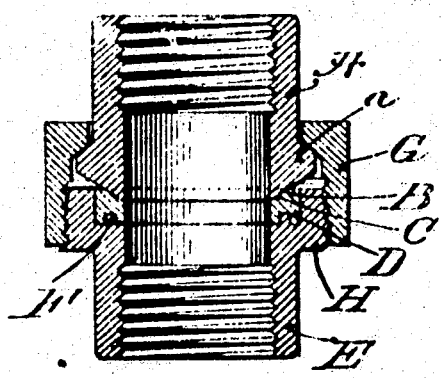
Witnesses
Edward L. Fry
A. C. Richardson
Inventor
William H. Stoddard
by
Phillips Van Everen & Fish
atty

UNITED STATES PATENT OFFICE.

WILLIAM H. STODDARD, OF SOMERVILLE, MASSACHUSETTS.

PIPE-COUPLING.

No. 909,989.

Specification of Letters Patent.

Patented Jan. 19, 1909.

Application filed July 24, 1907. Serial No. 385,251.

*To all whom it may concern:*

Be it known that I, WILLIAM H. STODDARD, a citizen of the United States, residing at Somerville, in the county of Middlesex and State of Massachusetts, have invented certain new and useful Improvements in Pipe-Couplings; and I do hereby declare the following to be a full, clear, and exact description of the invention, such as will enable others skilled in the art to which it appertains to make and use the same.

The invention relates to pipe unions or couplings, and more especially to couplings in which a packing ring or seat is permanently secured in at least one of the members of the coupling.

The object of the invention is to provide a coupling in which the seat ring is secured in place in such manner that the joint will not be injuriously affected by the expansion and contraction of the two different metals of which the seat and part in which it is secured are formed, and that a tight joint will be secured under all conditions and under pressures which the unions as heretofore constructed are unable to resist.

In accordance with the principal feature of the invention, an annular recess is formed in a coupling member, the bottom of which is provided with a channel having substantially parallel walls, and the seat ring is provided with a tongue fitting within the channel. The comparatively thin tongue on the seat ring is thus firmly held between the walls of the channel, and a reliable and efficient joint between the ring and coupling member is provided. The ring presents an ample seat area for the coöperating coupling member, while being firmly and securely united to the coupling member by a comparatively thin annulus containing a comparatively small amount of metal, and presenting a comparatively large joint surface, so that the expansion and contraction of the metal in the joint is comparatively small, and has no injurious effect on the joint.

In accordance with a further feature of the invention, I so shape the bottom of the recess between the annular channel and the bore of the coupling member that an annular rib is formed on the bottom of the recess which is embraced by the metal of the seat ring. This rib will thus be moved with the ring as it expands and contracts, with a resulting decrease in the chance of the ring ever becoming loose or the joint impaired under extreme changes of temperature and under unusual conditions.

The invention will be understood from an inspection of the drawing, in which the figure shown is a longitudinal sectional view through the center of the coupling embodying the invention.

As shown in the drawing, the coupling in which the invention is embodied is of the "union" type and is provided with a seat ring in the female member only. In this coupling the male member A is provided with a conical or convex face B adapted to engage and fit the conical or concave surface C of the seat ring D. The seat ring is formed of the usual hard non-corrodible metal such as brass or bronze. The seat ring is fitted within an annular recess formed in the end of the female member E of the coupling, being tightly driven or pressed in so that it is permanently united with the female member.

The recess within the female member of the coupling extends laterally from the bore of the member and longitudinally inward from the end of the member, and the seat ring is preferably so proportioned that it substantially fills the recess, the bore of the ring being of substantially the same diameter as the bore of the coupling member, and forming a part of the inner surface of the coupling member.

The bottom of the recess in the coupling member is provided with a narrow channel at its outer edge, the walls of which are substantially parallel. One wall of the channel is formed by the continuation of the outer wall of the recess, and the inner wall of the channel is formed by the outer wall of an annular rib F. The inner wall of the rib F is, in the form shown, substantially parallel with the outer wall, and is outside the bore of the coupling member. The inner end of the seat ring is provided on its outer edge with a comparatively thin tongue which fits tightly within the channel and seats upon the bottom of the channel. The seat ring is also provided with a flange or tongue which fits tightly against the inner wall of the rib F. With this construction the seat ring and coupling member are firmly and effectively united to present a tight joint which will not become loose or defective under high pressure and under varying temperatures. The tongue on the inner end of the seat ring is firmly gripped between the walls of the channel in the coupling member, and the walls being substantially parallel, there is no tendency for the tongue to be crowded or wedged out of the channel, and thus become loosened when expanded and contracted by variations in temperature. The tongue, being comparatively thin, contains but little metal compared with the surface area which acts to retain the ring in position, and therefore the expansion and contraction is small and not apt to cause injury or loosening of the joint. The tortuous form of the contacting surfaces, and their large area, also contribute to the efficiency and tightness of the joint.

In the form of joint shown the rib F is also embraced by the metal of the seat ring, and will move with the ring as it expands and contracts, thus increasing the reliability of the joint. With this construction also the inner surface of the seat ring may be formed flush with the bore of the coupling members, so that the inner surface of the coupling is substantially unbroken at the joint between the members of the coupling, and thus the danger of corrosion or injurious action upon the joint at this point is reduced to a minimum.

The male member A of the coupling is provided with a shoulder a and the members of the coupling are held together by a nut G engaging screw threads on the flange H of the female member of the coupling in the usual manner.

While I have shown the invention embodied in a coupling in which the members of the coupling are held together by a nut, and in which the female member only is provided with a seat ring, it will be understood that the invention may be embodied with advantage in other forms of coupling, such, for instance, as flange unions, and it will also be understood that the seat ring may be secured in either member of the coupling, or that both members of the coupling may be provided with seat rings.

Having explained the nature and object of the invention, and specifically described one form of coupling in which the invention is embodied, what I claim is:—

1. A pipe coupling comprising metallic male and female members and means for securing them together, a recess in one member provided with a channel having substantially parallel cylindrical walls, and a metal seat ring fitting within said recess and provided with a tongue fitting tightly in said channel, substantially as described.

2. A pipe coupling comprising a metallic coupling member, an annular recess extending radially outward from the bore of the member and inward from the end of the member, a channel in the bottom of the recess at its outer edge having substantially parallel cylindrical walls, and a metal seat ring fitting within the recess and provided with an annular tongue fitting tightly between the walls and against the bottom of the channel, substantially as described.

3. A pipe coupling comprising a metallic coupling member, an annular recess extending radially outward from the bore of the member and inward from the end of the member, a channel in the bottom of the recess at its outer edge having substantially parallel walls, an annular rib between the channel and the bore of the coupling member, and a metal seat ring fitted within said recess and provided with a tongue fitting tightly between the walls and against the bottom of the channel, and with a flange fitting against the inner side of the rib, substantially as described.

4. A pipe coupling comprising a metallic coupling member, an annular recess extending radially outward from the bore of the member and inward from the end of the member, a channel in the bottom of the recess at its outer edge having substantially parallel cylindrical walls, an annular rib between the channel and the bore of the coupling member, a metal seat ring fitting within said recess and provided with a tongue fitting tightly between the walls of the channel and with a flange fitting against the inner side of the rib, a concave seat on the ring, a coupling member provided with a convex face engaging said seat, and means for securing the coupling members together, substantially as described.

In testimony whereof I affix my signature, in presence of two witnesses.

WILLIAM H. STODDARD.

Witnesses:
 IRA L. FISH,
 ANNIE C. RICHARDSON.